United States Patent [19]

Deck

[11] Patent Number: 4,690,208
[45] Date of Patent: Sep. 1, 1987

[54] CONTAMINATED FLUID HEAT EXCHANGING

[76] Inventor: Brent D. Deck, 24 Shawmut Ter., Framingham, Mass. 01701

[21] Appl. No.: 825,535

[22] Filed: Feb. 3, 1986

[51] Int. Cl.$^4$ .............................................. F28F 13/12
[52] U.S. Cl. .................................... 165/119; 165/143; 165/158; 210/181; 210/443; 210/498
[58] Field of Search ........................ 165/143, 119, 158; 210/435, 443, 483, 498, 162, 163, 175, 181, 323.1, 323.2, 336; 251/117, 127; 137/599, 544, 545

[56] References Cited

U.S. PATENT DOCUMENTS

| | | | |
|---|---|---|---|
| 984,705 | 2/1911 | Rarick | 210/336 X |
| 2,413,360 | 12/1946 | Maguire et al. | 165/143 X |
| 3,566,502 | 3/1971 | Pasqualini | 165/143 X |
| 4,413,675 | 11/1983 | Gano | 165/119 |
| 4,545,906 | 10/1985 | Frederick | 210/181 X |

*Primary Examiner*—Albert W. Davis, Jr.
*Assistant Examiner*—Richard R. Cole
*Attorney, Agent, or Firm*—Charles Hieken

[57] ABSTRACT

A heat exchanging system for exchanging heat with contaminated water includes a housing having a coaxial tube exchanger assembly with return passages in the housing ends for the outer tubes and return tube bends for the inner tubes. A filter at the inlet of the coaxial tube assembly is formed of a number of passages in parallel with right angle bends defined by parallel fins between a bottom plate and transparent top plate. For cleaning there is a pressure chamber, a fill valve and an air valve intermittently activated. There is also a drain valve and a vacuum release valve. Heat exchanger tube is manufactured by rotatably and axially feeding tubing through a repeating impacting pointed power hammer that forms sharp edge craters on the exterior of the tube and sharp peaks on the interior. An impact tool driven by a powered impact hammer strikes the tubing passing through a tube pathway defined by variable direction rollers. A power drive roller has its axis askew to the axis of the tube.

15 Claims, 7 Drawing Figures

CONTAMINATED FLUID HEAT EXCHANGING

This invention relates in genreal to heat exhangers and more particularly to filtered heat exchangers for use in heat recovery from waste water and other highly contaminated fluids.

A search of prior art uncovered U.S. Pat. Nos. 2,028,471, 2,075,784, 3,690,373, 4,422,932 and 4,529,032.

Patent 4,529,032 discloses a coil heat exchanger which is not repairable or cleanable. U.S. Pat. No. 4,422,932 describes uncleanable, uninspectable, non-repairable coils enclosed in a tank and arrangement which appears to be inefficient and highly prone to fouling on the external coil surfaces due to the inability to pass fluid at high velocities over the exterior of the coils. By contrast the present invention described below passes waste water through a single continuing serpentine path with no obstructions or places for unusual fouling to occur. U.S. Pat. No. 2,028,471 includes a continuous path through an inner tube, but fails to provide for the ease of cleaning and tube replacement. U.S. Pat. No. 2,075,784 has the disadvantage of tube heater sheets which act like sieves to collect and trap debris inside the heat exchanger. Lint and string which worms its way through a perforated filter will drape over the tube entrance regions on a tube heater eventually causing decreased performance. U.S. Pat. No. 3,690,373 would have the same problem if exposed to a linty waste water. The lint which passed through the internal screen filter (prior to the clogging of the filter) would rapidly clog in multiple contact points in the plates of the heat exchanger.

An important object of this invention is to provide a simple means of manufacturing a heat exchanging system which will reliably recover heat from waste water from laundrys, dishwashers and other sources with high solids loading.

Other important objects of this invention are to provide a filtering system which is easy to inspect, easy to clean and slow to clog when subjected to a waste water flow from a laundry or dishwasher.

Another object of this invention is to provide a heat exchanger with an interior that is easily inspected, cleaned or repaired.

A further object of the invention is to provide economical means of manufacturing vented double-wall tubing.

According to the invention, there is heat exchanging apparatus comprising filter means for filtering contaminants, heat exchanging means for exchanging heat between fluids, first and second means for pumping the fluids, first and second reservoir means for storing fluid and control means for controlling fluid flow. The filter means comprises a plurality of passages in parallel of relatively large cross sectional area having angular bends which are preferably visible through a transparent cover forming both a sealing surface for the filter means and one side of each passage.

Numerous other features, objects and advantages of the invention will become apparent from the following specification when read in connection with the accompanying drawing in which.

Figure 1:
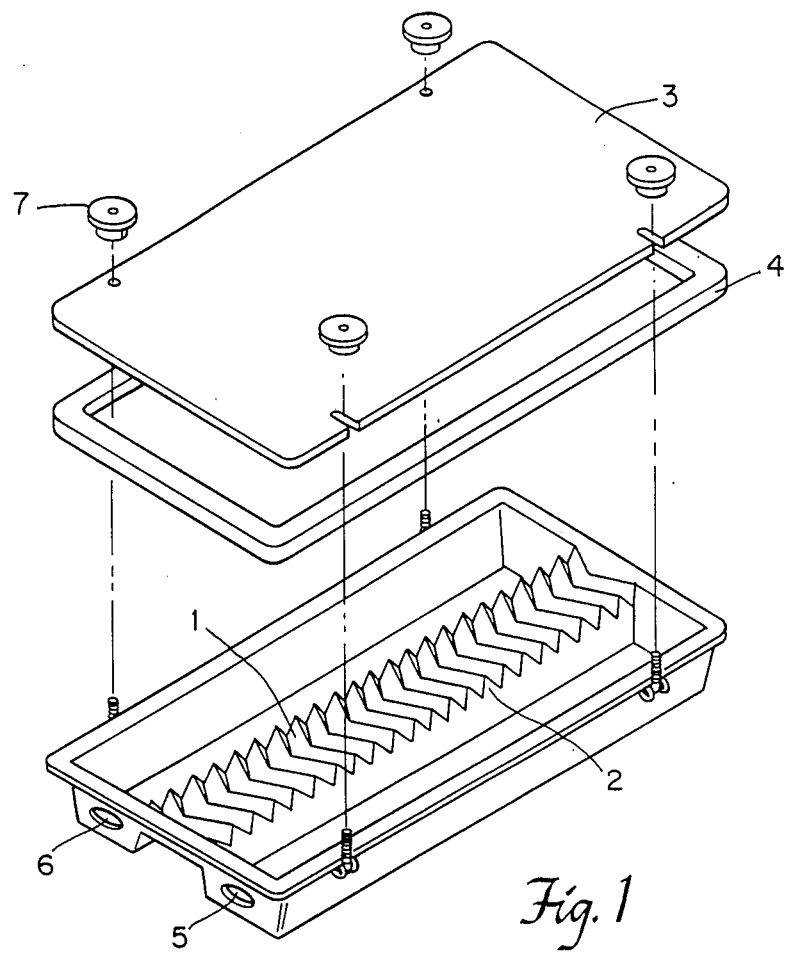
FIG. 1 is a perspective view of a filter component in a typical embodiment for waste water heat recovery.

Referring now to the drawing and more particularly FIG. 1, a feature of the invention is the substantially right angle passages 1 between substantially right angled fins preferably thick relative to the length of fibers in fluid being filtered, fin thickness typically being ¾" thick, extending upward from the interior of the filter or strainer enclosure into a close tolerance with the preferably transparent cover 3, which when pressed against the gasket means 4 both seals the filter enclosure, and forms a top boundary for each of the right angle passages 1.

The filter in this system is unique in that it passes as many solids as possible, and only catches the long, slender types of solids, such as sticks and straws, which would pass through much smaller openings in a more conventional type of filter, but would still tend to clog a pump, piping elbow or return bend in a heat exchanger. During the operation of the heat exchanging system, waste water enters the filter enclosure through entrance 5, preferably at a direction enclosing the entrance region to the right angle passages 1. Lint, string and small substantially spherical solids easily pass through the right angle passages 1 and subsequently through the remainder of the described heat exchanging system, all of which is designed to handle such solids without clogging. A long slender object which enters the entrance 5 will lodge within the right angle bend area of the right angle passages. Since this type of solid is only a small part of the total solids in most of the waste water encountered, the described filter will last longer than a conventional type of filter of much greater size without clogging. Additionally, because the filter has a transparent cover and is mounted inclose proximity to the work areas, it maybe readily inspected.

Near the entrance region 5 or exit region 6, those skilled in the art may find it useful for certain applications to add a more conventional filter in the form of a, for instance, perforated plate or basket, a retainer for which might be readily cast into another embodiment of this invention.

Because the filter is preferably located on the suction side of the waste water pump, only slight sealing pressure is required by the clamping devices 7, which in a simple embodiment are wing nuts on hinged bolts, some of which swing free from the cover, and others of which remain attached to the cover when loosened forming a hinging device for the lid itself.

An advantage of this type of filtering device is that the enclosure and hinges may be cast economically as one piece, and the cover may be a simple flat plate of transparent acrylic, glass or other suitable material. Thus, machining and fabrication costs are minimized.

A further advantage is that cleaning the filter requires merely raking the debris from the passages because opening the cover also opens up one side of the passages. This feature is a significant advantage over perforate plate filters which would require meticulous picking of lint and string, which tends to snag in conventional filters. Another benefit of this type of filter is that a small drink-mixing stick, which may be less than 1/16" in diameter and is a common contaminant in laundry and dishwater wast water, will not pass through the filter according to the invention, even though each of the right angle passages 1 is orders of magnitude larger than the 1/16 of an inch diameter perforation which would be required in a conventional filter to positively prevent such a stick from passing through a conventional filter. That is, such larger openings in right angle passages 1 prevent the filter according to the invention from clogging with materials which do not which do not need to be filtered to assure proper operation of the heat exchanger system.

Figure 2:
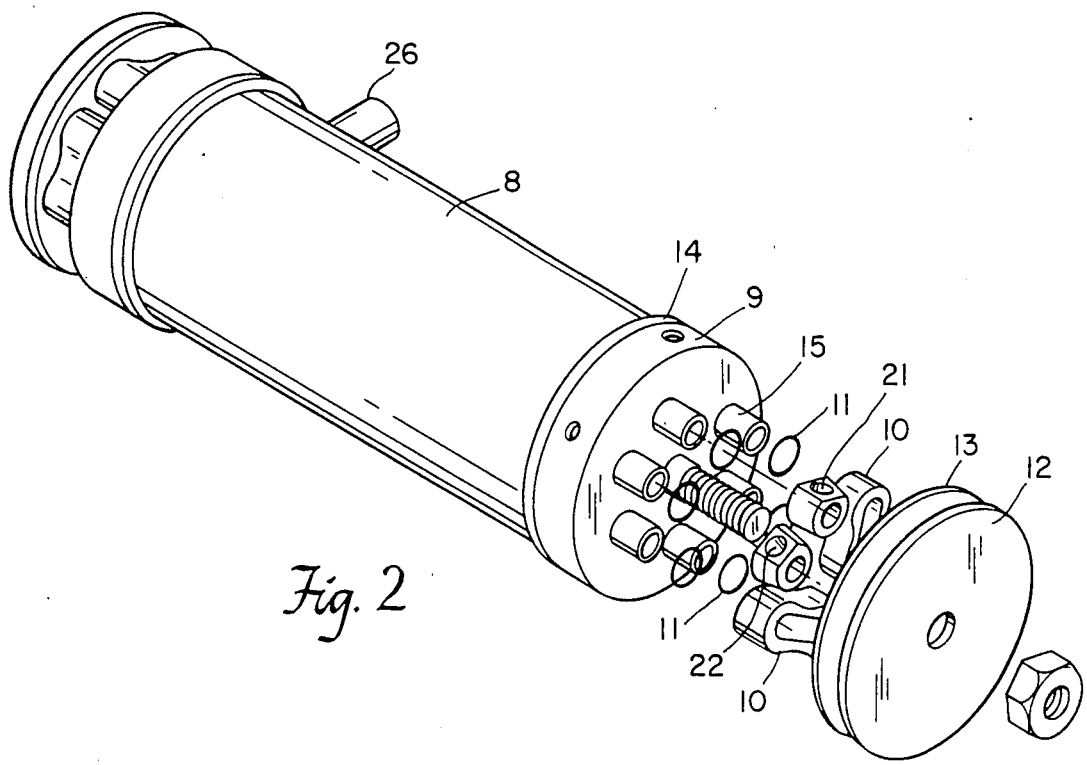
FIG. 2 is an exploded perspective view of a typical embodiment of a heat exchanger.
Figure 3:
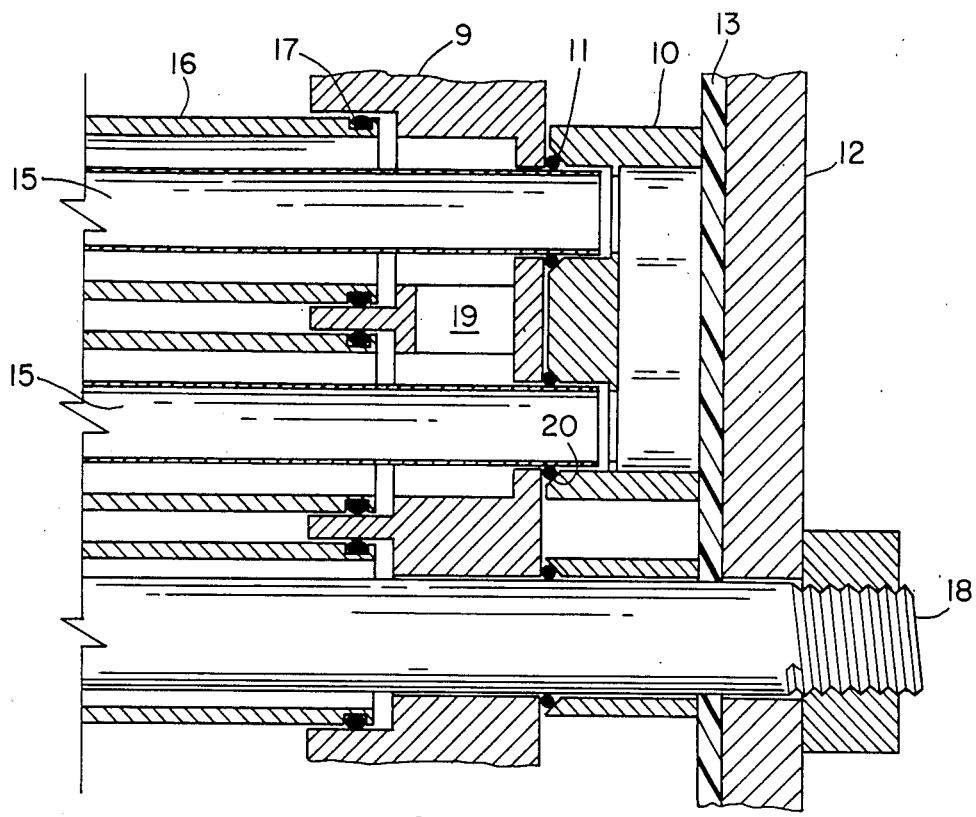
FIG. 3 is a cross sectional view of a portion of one end of the heat exchanger.

In FIGS. 2 and 3 the heat exchanger comprises a housing 8 bounded by housing end 9 with gasket means 14. Inner tubes 15 extend loosely through the housing end 9 where preferably elastomeric compression rings 11 are compressed between housing end 9 and return bends 10, forming a seal which prevents leakage from inside the housing to the atmosphere, from inside the return bend to the atmosphere and between the housing end and the return bends. Compression ring 11 is held regularly by retainer means 20, which in the pictured embodiment, is a shoulder of chamber machined into the return bend 10. Alternate retainer means might be a stamped metal or high density polymer backup wafers or otherwise fabricated devices to prevent radial distortion of the compression ring 11.

Sealing pressure is provided by one or more bolt means 18, compressing end plate 12 against gasket sheet 13, which both seals the end of the return bend 10 and presses the return bends against the compression rings 11. An advantage of the differential sealing method is that it allows great thermal expansion between tube and housing without failure.

The open nature of return bends 10 allows for ease in fabrication by casting and ease of inspection when the plate 12 at gasket sheet 13 is removed. Gasket sheet 13 is preferably an elastomeric disk covering the entire surface of plate 12, preventing corrosive fluids from contacting the surface of plate 12, which may therefore be made of noncorrosion-resistant materials.

The path formed by the inner tubes 15 and return bends 10 within the housing 8 is that of one or more continuous serpentine passages beginning at entrance 21 and ending at exit 22.

Waste water flowing through inner tubes 15 is advantageous because there is no tube header in the path of the waste water in which solids would accumulate. Bolt means 18 is preferably a single bolt through the center of housing 8. By disconnecting the single bolt means 18, all inner tubes 15 immediately become loose and removable, without any other tools being necessary. This feature allows a single unskilled worker to completely retube a heat exchanger in less than an hour. An advantage to this easier method of retubing is that copper, a highly heat conducting but less corrosion resistant material than stainless steel, may be used within a high velocity heat exchanger to obtain higher heat transfer efficiencies at lower cost, without maintenance and repair costs becoming overwhelming.

Within the housing end 9, which is preferably formed by traditional casting methods, are return passages 19 for a second fluid. Outer tubes 16 fitted with ring means 17 fit snugly into the openings of the return passages 19. The inner tubes 15 and outer tubes 16 form a simple concentric-tubes heat exchanger, with a typical embodiment having, for instance, 18 inner and outer tubes in a housing.

Another advantage of this configuration is that while a traditionally built concentric-tube heat exchanger would have multiple sites which could become sources of leaks at outer tube and inner tube return bends, the present invention reduces all these potential sites for leaking fluid to the atmosphere, to gasket sheet 13, gasket means 14 and compression rings 11. The present invention reduces by an order of magnitude the number of joints which must be secured from leaking to the atmosphere, thereby reducing the cost to the manufacturer. A slight leak on O-ring 17 will merely allow fluid from the outer tube 16 into the housing 8. The housing 8 will rapidly become pressurized, and such leaks will have no effect except to create slight decrease in performance due to a short circuiting effect. Because a slight internal leakage may be acceptable, the amount of machining required on return passage 19 to accept the O-ring 7 is minimized, and so is the manufacturing cost. A major benefit of the invention is that machining can be largely limited to inexpensive surface grinding of cast parts.

Pressurizing the housing 8 with water from leaking O-rings or with water applied from a separate source ceates additional sealing pressure on the compression rings 11 by forcing the housing end 9 outward against the restrained return bends 10.

Another benefit of the present invention is that the walls to the outer tube 16 see substantially no pressure since they are contained within a housing that is at substantially the same pressure as in the outer tubes. The outer tubes 16 may therefore be made of inexpensive materials, such as rigid PVC pipe. In one embodiment of the invention, if O-rings 17 are seated into well-machined passages 19, equalizing passage 25 from some point in the path of the second fluid pressurizes the housing 8 automatically. A commercially available air eliminator 26 bleeds potentially corrosive explosive air in the top of the housing.

Second fluid, for instance, fresh water, entrance 23 and exit 24 are located preferably to create counterflow fresh water and heat transfer in the heat exchanger.

Figure 4:
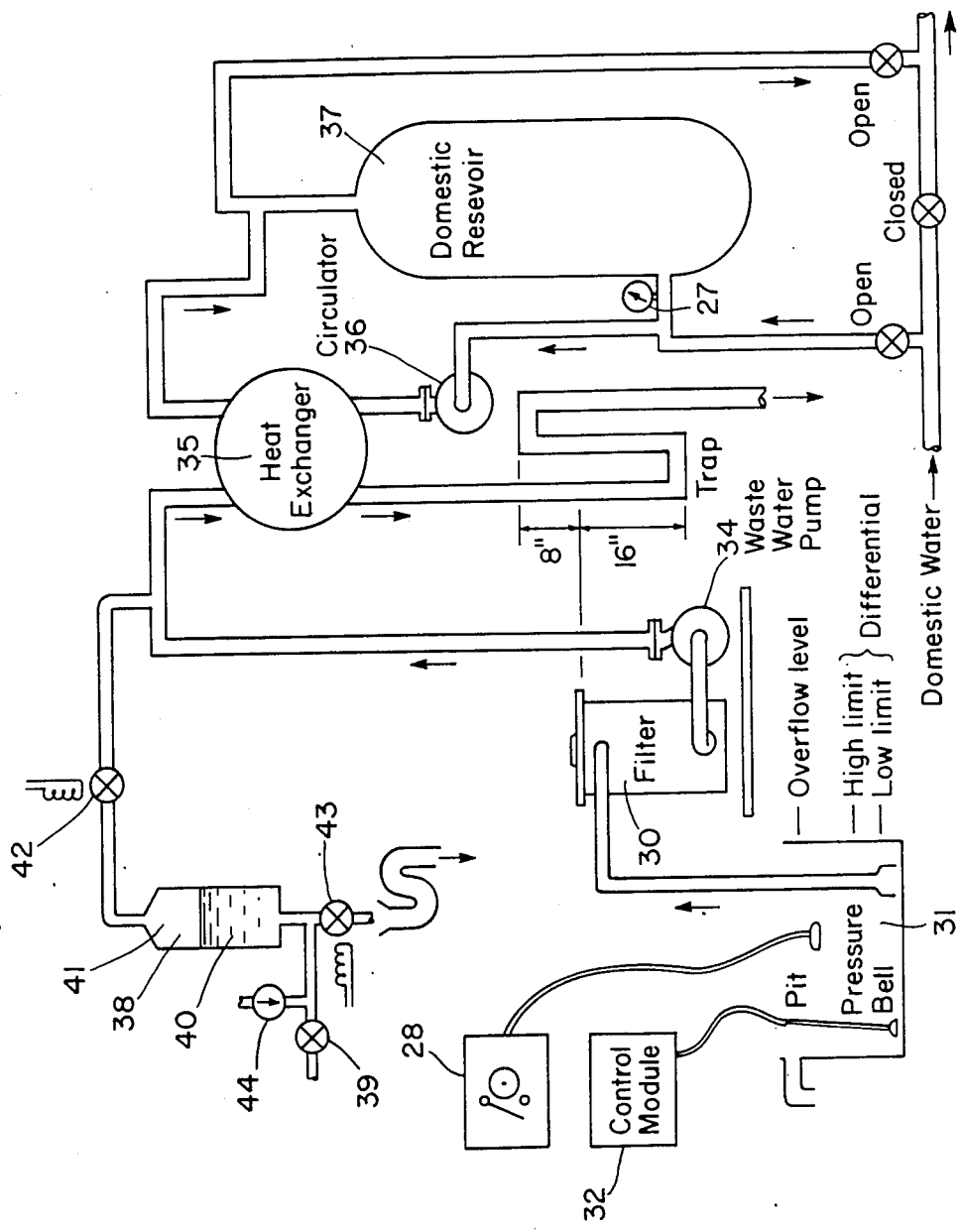
FIG. 4 is a schematic of a preferred embodiment of the heat exchanging system.

FIG. 4 shows a typical application of the present invention for use in a laundry waste water system. Pump 34 sucks waste water through filter 30 from waste water reservoir 31. Water level sensor 32, preferably a pressure switch, in reservoir 31 activates waste water pump 34, which pumps waste water thorough inner tubes of heat exchangers 35 and out to drain. Switch 32 also activates fresh water pump 36 which circulates fresh water from the bottom of the fresh water reservoir 37 through heat exchanger 35 back to the top of the fresh water reservoir.

Preferably, a temperature sensor 27 at the bottom of fresh water reservoir 37 is wired in series with water level sensor 32 to shut down pumps 34 and 36 when no more heat is required. A second water level sensor 28 overrides the temperature sensor 27 when reservoir 31 is nearly overflowing, activating both pumps and capturing more heat.

Aside from the clogging effects of solids, laundries which use soap tend to develop a soap scum on the insides of heat exchangers and pipes. Periodic high water velocity scours much of this soap away. A device which generates these high velocities without excessive water or air pumping requirement utilizes a suitably large pressure chamber 38 into whcih a slow trickle of pressurized fluid, such as fesh water, enters through a substantially permanently adjusted fill valve 39.

The fluid 40 within the chamber rises within the chamber, pressurizing the trapped air 41 until the air pressure is essentially that of the entering fluid. A simple timing circuit periodically opens air valve 42, creating a temporary surge of pressure within the piping and heat exchangers 35 about four times that created only by pump 34. This increased pressure temporarily creates the normal water velocity within the piping and heat exchanger, creating an enhanced scouring effect on the soap film. As the timing cycle progresses, the control circuit closes air valve 42 and opens drain valve 43. Vacuum breaker 44 opens automatically to allow fluid 40 to drain from chamber 38 much faster than it is filling through fill valve 39. The control circuit then closes valve 43, and the timing cycle beings again as pressure chamber 38 fills.

The advantages of this system where fluid 40 is city water is that is creates higher velocities than would often be possible if fresh water lines were connected directly to the lines to be cleaned. Such direct connection requires a fresh water line large enough in diameter so that it would not suffer great pressure drop at the increased velocity. The use of air as a pressure medium allows for a smaller diameter valve 42, allowing both economical construction and fast operation at minimal power input.

Figure 5:
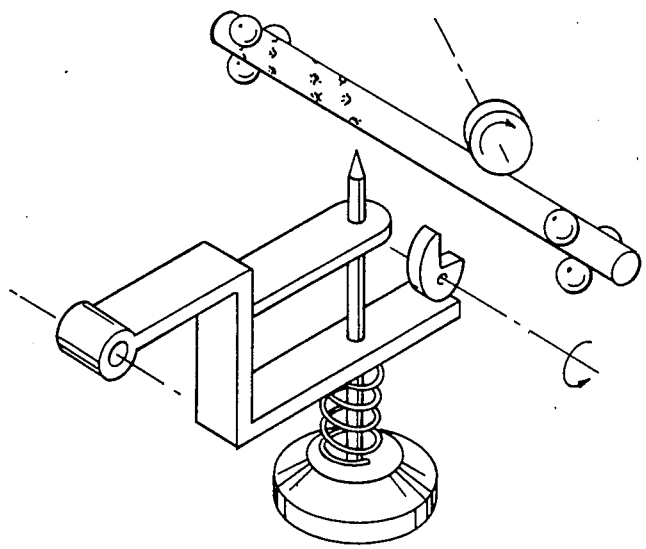
FIG. 5 is a perspective representation of a tool for texturing heat exchanger tubes.

In FIG. 5 a thin wall heat exchanger tube 46 is driven rotationally and axially by a skewed motorized drive roller 47 while a preferably cam-driven impact hammer 48 drives a substantially pointed impact tool into the tube to create turbulence generating protrusions on the interior and exterior surfaces of the tube. Preferably multidirecional rollers 49 define the pathway for the tube and restrain it within the pathway.

One advantage of dimpling a tube in this manner is that this technique may be used on extremely hard metals, such as high chrome stainless steels, to generate an interior turbulence-generating texture. Other surefire techniques are not economical or suitable in many cases for such metals. An advantage of a closely spaced inscribed dimpled texture pattern is that this texture both increases fluid turbulence and increases surface area of the tube, thereby creating better heat transfer versus pressure drop than, for instance, the insertion of turbulators within the heat exchanger.

Another advantage is that the described texturing method improves the heat transfer on both the inside and outside surfaces of the tube with just one operation.

Figure 6:
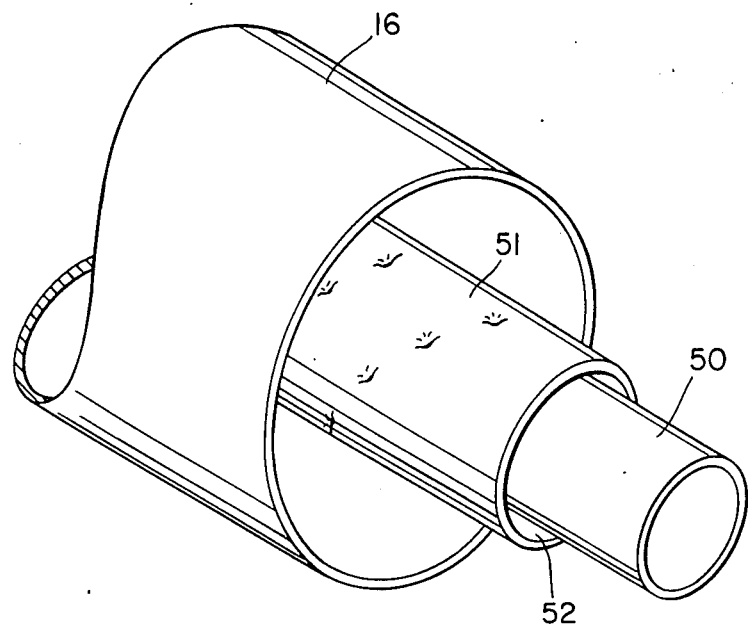
FIG. 6 is a perspective view of a vented double-wall heat exchanger tube.

A further advantage of this method of texturing heat exchanger tubing is that the process can also be used to make vented double wall tubing in the same operation that textures the tube, simply by inserting a close-fitting tube 50 of a smaller diameter inside the tube to be textured 51, as shown in FIG. 6. If the tubes are a soft metal, such as copper, the impact of the tool will drive the outer tube into heat conducting contact with the inner tube, while improving the turbulence over both, due to the dimpling effect. The vented double wall is a means to avoid cross contamination between two sides of a heat exchanger by allowing water which may leak into the void between the walls to run out the vented end 52.

Figure 7:
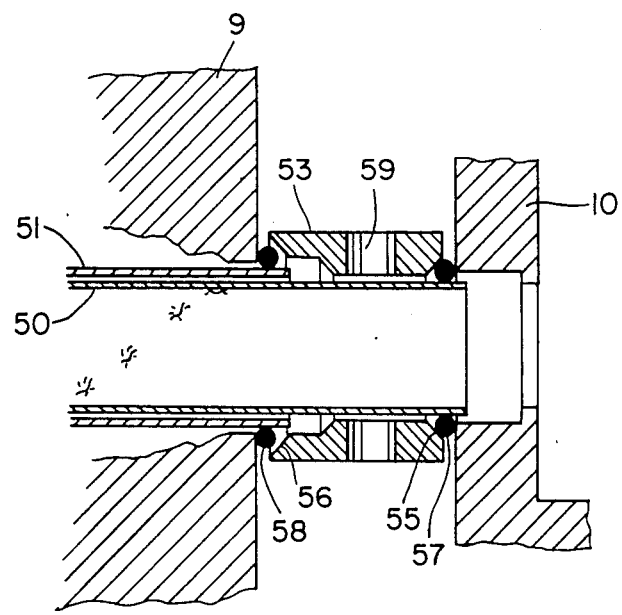
FIG. 7 is a sectional view of the spacer used to fit a double-wall tube into the preferred heat exchanger.

As shown in FIG. 7, in order to allow this vented water to drip from the heat exchanger and thereby make the leak known, a ventilated spacer 53 with vent holes 59 and retainer means 55 and 56 (illustrated as chamfers on the ends of the spacer) compresses compression rings 57 and 58 to separately seal the fluids in the inner and outer tubes. Vent holes 59 allow leaks to vent to atmosphere.

The present invention has several advantages over the prior art in simplicity, economy of manufacture, cleanability and repairability.

All prior art technologies believed to be currently in use in the United States utilize filtering systems made up of essentially perforated metal plates. These designs all have the disadvantage of trapping more solids than are necessary for preventing clogging of the type of heat exchanger used in the present invention. The present invention therefore embodies a smaller, simpler, less clog-prone filter assembly, which is easier to service than known in the prior art.

There has been described novel apparatus and techniques for exchanging heat with contaminated fluid characterized by numerous advantages described above. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques disclosed herein and limited solely by the spirit and scope of the appended claims.

What is claimed is:

1. Mechanical filtering apparatus comprising,
    means defining a fluid inlet,
    fluid inlet means for receiving fluid,
    fluid outlet means for expelling fluid,
    a plurality of passage means intercoupling in parallel said fluid inlet means and said fluid outlet means for carrying fluid, string, lint and small substantially spherical solids from said fluid inlet means to said fluid outlet means while blocking the transfer of long thin objects,
    each of said passage means being formed with an angular elbow which allows passage of fluid, string, lint and small substantially spherical solids therethrough but prevents the passage of said long thin objects.

2. Mechanical filtering means in accordance with claim 1 wherein said angle is substantially a right angle.

3. Mechanical filtering means in accordance with claim 1 wherein said passage means comprises a plurality of generally parallel angled fins generally perpendicular to first and second opposed bounding surfaces.

4. Mechanical filtering means in accordance with claim 3 and further comprising gasket means for sealing said opposed bounding surfaces,
    and clamping means for urging said opposed bounding surfaces together.

5. Heat exchanging apparatus comprising,
    housing means for surrounding a tube assembly having first and second opposed housing ends,
    return passage means within said housing ends for carrying fluid,
    said tube assembly being concentric tube assembly in said housing having outer tubes extending between said return passage means of opposed housing ends,
    and sealing means between said outer tube and said return passage means for establishing a fluid-tight seal therebetween and further comprising, mechanical filtering means for filtering said fluid and comprising, fluid inlet means for receiving fluid, fluid outlet means for expelling fluid, a plurality of passage means intercoupling in parallel said fluid inlet means and said fluid outlet means for carrying fluid, string, lint and small substantially spherical solids from said fluid inlet means to said fluid outlet means while blocking the transfer of long thin objects, each of said passage means being formed with an angular elbow which allows passage of fluid, string, lint and small substantially spherical solids therethrough but prevents the passage of said long thin objects.

6. Heat exchanging apparatus in accordance with claim 5 wherein said parallel passages are defined by generally parallel fins extending between first and second opposed bounding surfaces.

7. Heat exchanging apparatus in accordance with claim 5 wherein said concentric tube assembly includes inner tubes concentric within said outer tubes and extending through said housing ends and further comprising,
   inner tube return bends intercoupling adjacent ones of said inner tubes,
   return bend sealing means in compression at the interface of return bends, housing ends and inner tubes for establishing a seal therebetween,
   end plate means engaging said return bend sealing means,
   and end clamping means for applying clamping action to said end plate means to compress said end bend sealing means.

8. Heat exchanging apparatus in accordance with claim 7 wherein said parallel passages are defined by generally parallel fins extending between first and second opposed bounding surfaces.

9. Heat exchanging apparatus in accordance with claim 7 and further comprising,
   inner tube bends having outer faces open,
   and gasket sheet means for sealing said open outer faces.

10. Heat exchanging apparatus in accordance with claim 9 wherein said parallel passages are defined by generally parallel fins extending between first and second opposed bounding surfaces.

11. Heat exchanging apparatus in accordance with claim 5 and further comprising,
   means for pressurizing the volume inside said housing means and outside said outer tubes.

12. Heat exchanging apparatus comprising,
   input means for receiving heat exchanging fluid,
   output means for expelling heat exchanging fluid,
   mechanical filtering means for filtering said heat exchanging fluid and comprising,
   fluid inlet means for receiving heat exchanging fluid,
   fluid outlet means for expelling heat exchanging fluid,
   a plurality of passage means intercoupling in parallel said fluid inlet means and said fluid outlet means for carrying heat exchanging fluid, string, lint and small substantially spherical solids from said fluid inlet means to said fluid outlet means while blocking the transfer of long thin objects,
   each of said passage means being formed with an angular elbow which allows passage of heat exchanging fluid, string, lint and small substantially spherical solids therethrough but prevents the passage of said long thin objects.

13. Heat exchanging apparatus in accordance with claim 12 wherein said angle is substantially a right angle.

14. Heat exchanging apparatus in accordance with claim 12 wherein said passage means comprises a plurality of generally parallel angled fins generally perpendicular to first and second opposed bounding surfaces.

15. Heat exchanging apparatus in accordance with claim 14 and further comprising gasket means for sealing said opposed bounding surfaces,
   and clamping means for urging said opposed bounding surfaces together.

* * * * *